Aug. 30, 1932.   G. BURROWS   1,874,081
METHOD OF AND APPARATUS FOR CONNECTING PIPES IN BUILDING PIPE LINES
Filed Jan. 17, 1930   4 Sheets-Sheet 4
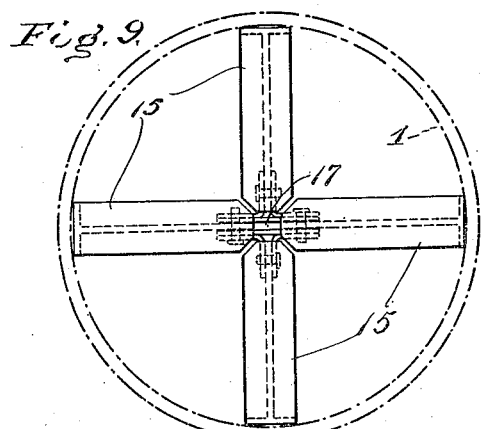
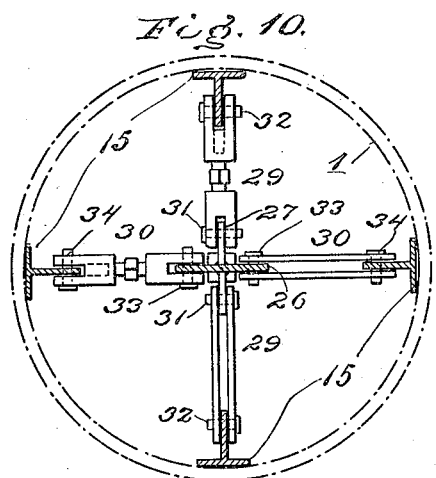
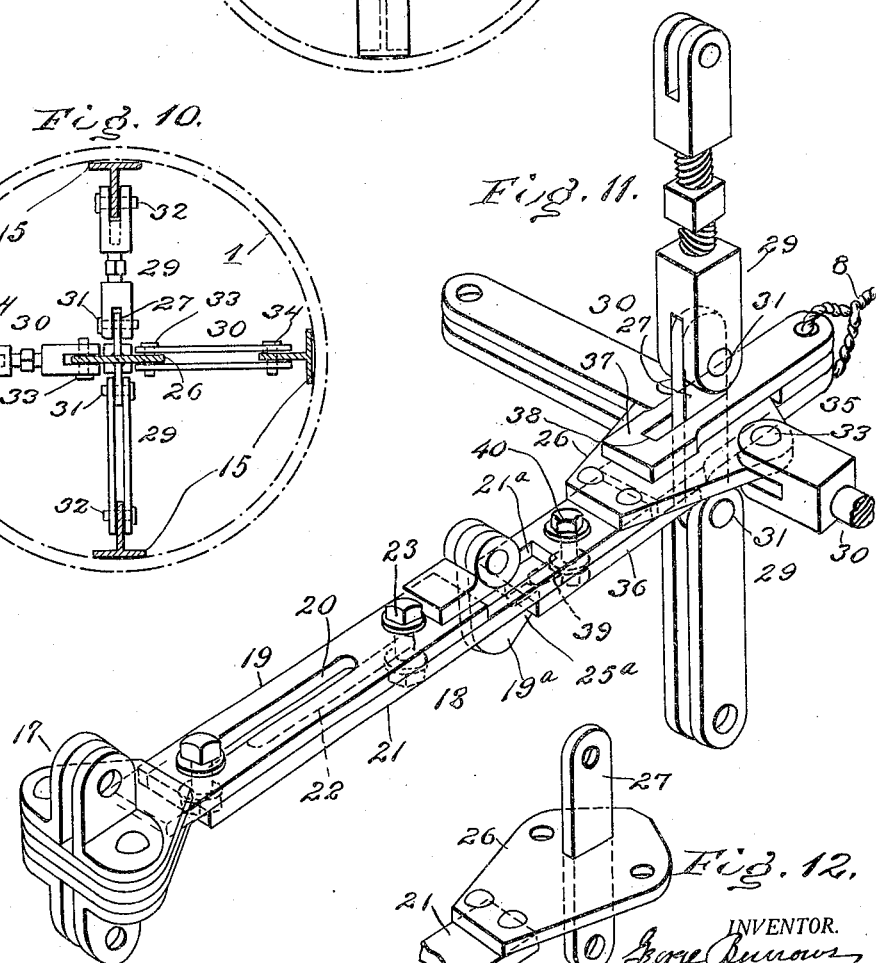
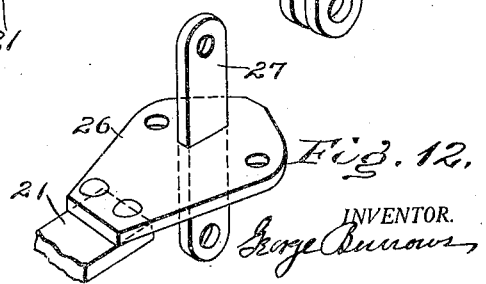
INVENTOR.
George Burrows
BY
Thomson, Kenner Campbell
ATTORNEYS Patented Aug. 30, 1932

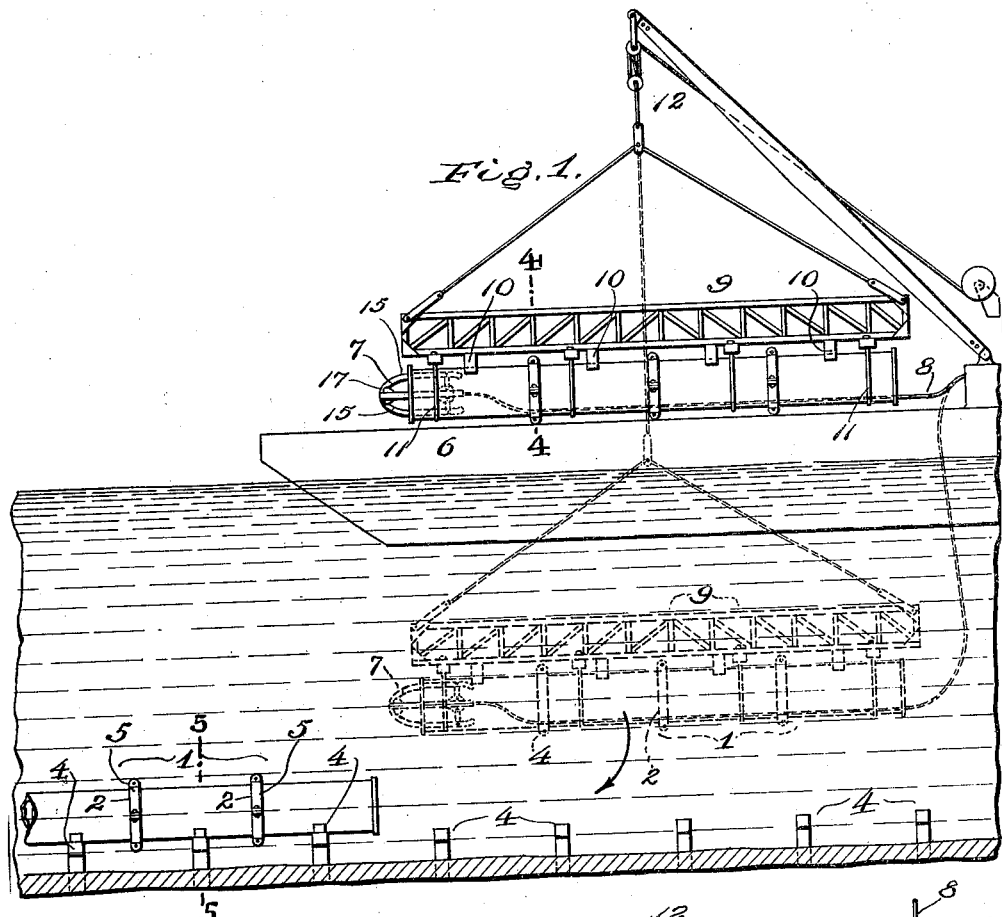
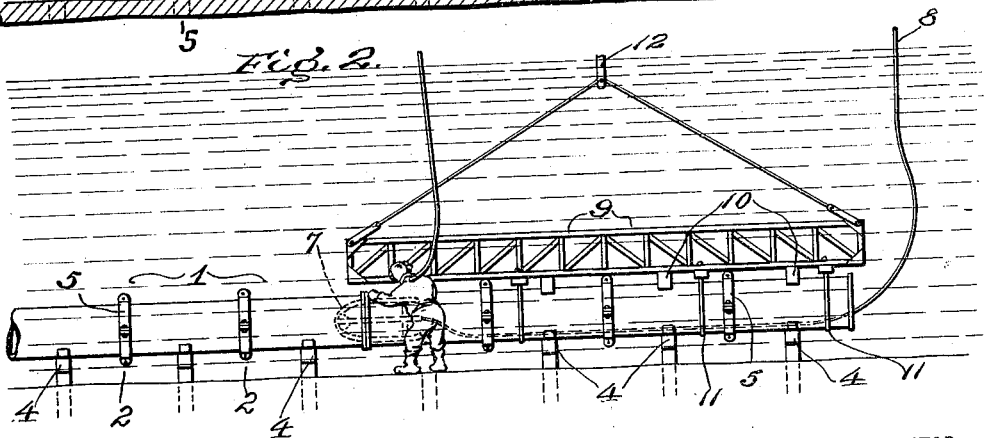

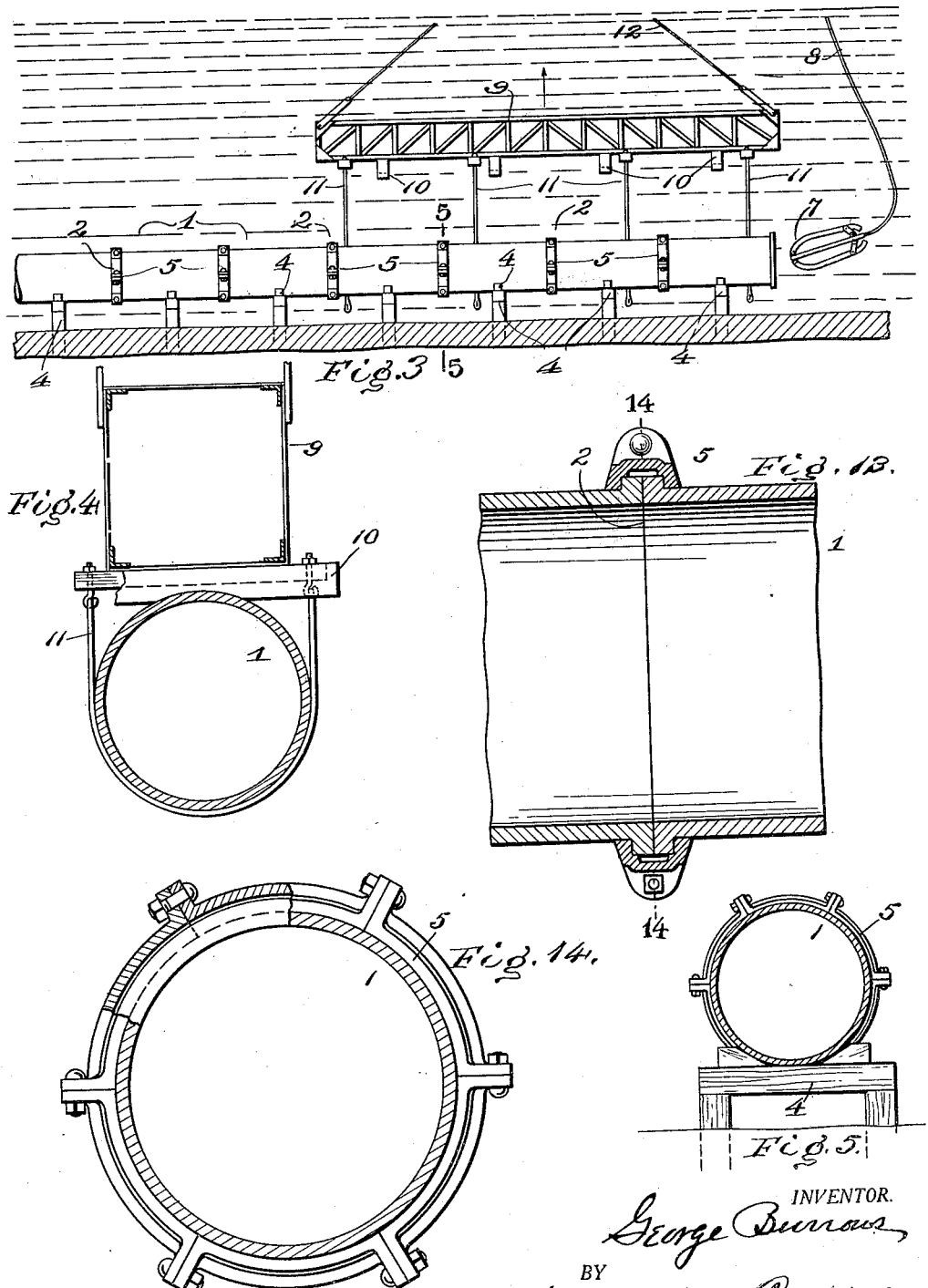

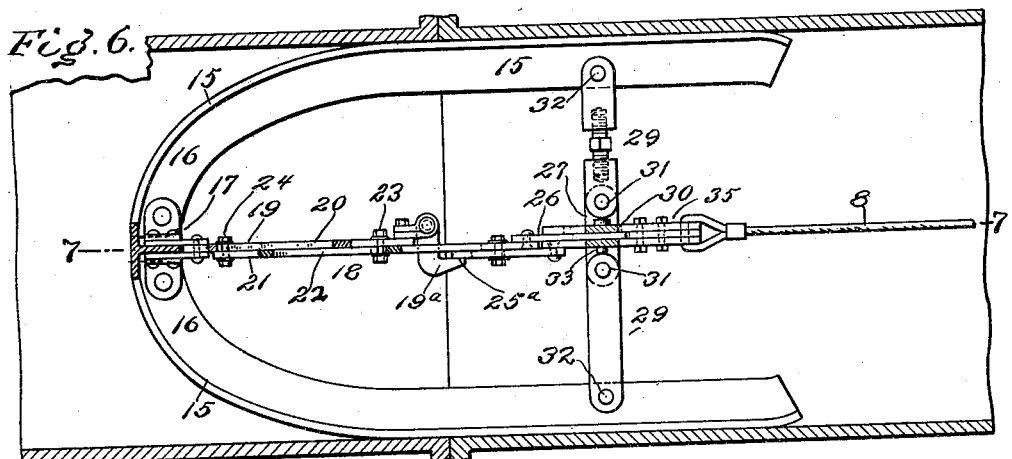
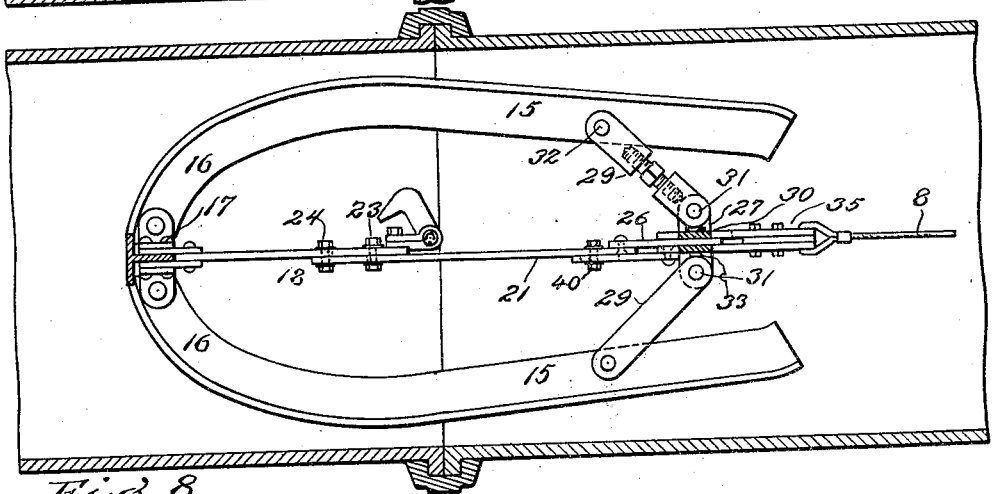
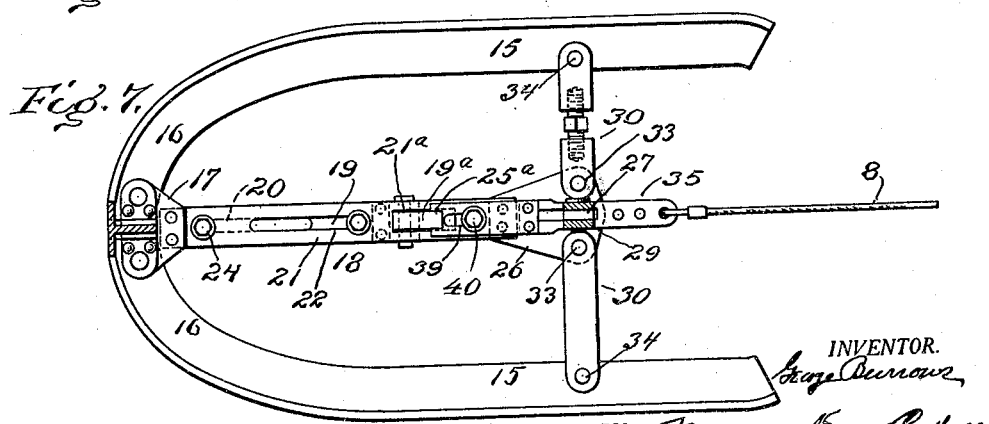

1,874,081

UNITED STATES PATENT OFFICE

GEORGE BURROWS, OF LONG ISLAND CITY, NEW YORK, ASSIGNOR TO MERRITT-CHAPMAN & SCOTT CORPORATION, OF NEW YORK, N. Y., A CORPORATION OF DELAWARE

METHOD OF AND APPARATUS FOR CONNECTING PIPES IN BUILDING PIPE LINES

Application filed January 17, 1930. Serial No. 421,582.

This invention relates to a means for and method of connecting together the pipe sections making up a pipe line, and has reference more particularly to a device for centering or alining the pipe sections relatively to each other in connecting them together, and the method involved in the use of said device, where the operations are carried out under the water, for example, in the construction of sewer pipe lines designed to discharge at a considerable distance from the shore.

In working under such conditions, where frequently the operations are carried on forty or more feet beneath the surface of the water, great difficulty is encountered by the divers in properly alining the abutting ends of the heavy pipe sections previous to their connection together, which difficulty is increased by reason of the muddy or otherwise unstable nature of the bottom on which the pipe line is to rest.

In accordance with the present invention to overcome such difficulties, I employ a centering device of novel form, which is temporarily and firmly positioned in the end of a pipe section or series of connected pipe sections, supported as by means of a scow or float, which centering device projects some distance beyond the end of the pipe section, and which is adapted when it has served its purpose, to be readily removed from the pipe. The pipe section or sections, with the centering device projecting therefrom, is now lowered into the water, and by the assistance of divers it is placed in general alinement with the pipe section or sections previously laid and to which the new section is to be connected. The pipe section or sections carrying the centering device, is then shifted endwise towards the previously laid section and the projecting end of the centering device is entered in said latter section, thereby accurately centering the new section relatively to the previous one, and suitable props or supports being inserted beneath the newly positioned section, the abutting ends of the two pipe sections are firmly connected together by any appropriate and well known means.

When the connection of the pipe sections has thus been made, the centering device, which has now served its purpose, is withdrawn from the connected pipe sections, and is hoisted to the surface of the water to be used in another and similar operation.

In the specification to follow, the invention will be described in detail, and the novel features thereof will be pointed out in the appended claims.

In the accompanying drawings:

Fig. 1 is a side elevation showing a number of submerged connected pipe sections in position, and a number of connected pipe sections provided with the improved centering device and supported on a float preparatory to being lowered for attachment to the submerged pipes, the partially lowered sections being shown by dotted lines.

Fig. 2 is a side elevation showing the new sections fully lowered and centered relative to the previously laid sections, preparatory to connecting said sections together.

Fig. 3 is a similar view showing the two sections after being connected together, and showing the removal of the centering device in collapsed condition;

Fig. 4 is a cross section on the line 4—4 of Fig. 1 on an enlarged scale, showing how the sections of pipe previously assembled on the float and equipped with the centering device, are supported while being lowered in the water;

Fig. 5 is a sectional elevation on the line 5—5 of Figs. 1 and 3 on an enlarged scale, showing how the pipe line is supported when in final position on the bottom;

Fig. 6 is a longitudinal section through two abutting centered pipe sections before they are connected together, showing in sectional elevation the improved centering device seated in expanded condition in one section and projecting therefrom into the other section to center said sections;

Fig. 7 is a longitudinal sectional elevation through the centering device on the line 7—7 of Fig. 6;

Fig. 8 is a view similar to Fig. 6, showing the centering device in collapsed condition preparatory to its removal, and showing the abutting ends of the pipes finally connected together;

Fig. 9 is an end elevation of the centering device as viewed in the direction of the arrow in Fig. 6, the surrounding pipe section being shown in dotted lines;

Fig. 10 is a similar view of the opposite end of the centering device;

Figs. 11 and 12 are fragmentary perspective views on an enlarged scale of certain details of the centering device;

Fig. 13 is a longitudinal section through the connected ends of two pipe sections; and Fig. 14 is a sectional elevation through the same on the line 14—14 of the preceding figure.

Referring to the drawings:

Referring to Figs. 1, 2 and 3, which illustrate the improved method of procedure in carrying out the invention, 1 designates a number of pipes or pipe sections connected together as at 2, and supported on the bottom by suitable props 4, such as shown for instance in detail in Fig. 5, similar props being provided as shown in Fig. 1 to support the new pipe sections as they are added to those already in position in constructing the pipe line.

The individual pipe sections are provided as usual with flanged ends as shown, which in connecting the sections together, are abutted against each other and are encircled by a connecting collar or sleeve 5 in the form of a number of segmental sections recessed to receive the flanges and bolted together in the form of an encircling ring as shown in Figs. 13 and 14. Such a method of connecting pipes together is well known in the art, and forms in itself no part of the present invention.

In carrying out the invention, a number of such pipes or pipe sections, four in the present instance, are first assembled and connected together end to end to form a length of pipe, preferably in the manner referred to, on a suitable support such as a scow or float or other vessel 6, positioned for the time being just beyond the end of the terminal submerged pipe section, and there is inserted and firmly positioned in the end pipe of the series, a centering device 7 with its nose or end projecting some distance beyond the end of the pipe, as clearly shown in Fig. 1. This centering device is of a form, to be described in detail later on, which will enable it to be expanded so as to seat tightly in the end of the pipe, and to be contracted or collapsed to permit its removal, which collapse and removal of the device is effected in the present instance by a line or a cable 8 connected thereto and leading outwardly through the opposite end of the series of pipe sections, as will be presently more fully described.

The series of connected pipe sections carrying the centering device is now ready to be lowered into the water and positioned alongside the previously submerged length of pipe, preparatory to the connection of the two together, and in order that in the lowering operation the connected pipe sections will be properly supported and braced and prevented from sagging or displacement and injury to the joints, a supporting structure or so called "strong back" is employed, consisting of an elongated frame 9, which is provided on its underside with saddles 10 recessed to receive the upper sides of the pipe sections and provided at intervals with tie straps 11 secured at their ends to the ends of the saddles and passing around the undersides of the pipes and thus suspending the series of pipes from the supporting structure, one of the ends of the respective straps being releasable from the saddles to permit of the detachment of the supporting structure from the length of pipe after the same has been lowered. This supporting structure with the series of connected pipe sections suspended therefrom, is now lowered into the water as shown by dotted lines in Fig. 1, by means of a hoisting tackle 12 carried by the float and connected to the ends of the frame 9 of the structure; and in this lowering operation the series of connected pipe sections are first positioned alongside the previously submerged sections, in general alinement with the same, and then by the aid of divers, the series of pipe sections is shifted endwise toward the previously submerged sections, the nose of the projecting centering device is entered in the adjacent pipe of the submerged sections as shown in Fig. 2, and the adjacent pipes abutted together. When thus positioned and the centering of the two lengths of pipe is effected, the newly positioned length is maintained in position by the insertion of the supporting devices 4 beneath it, and the sectional connecting sleeves 5, before alluded to, are applied to the abutting flanges on the ends of the pipes to effect the connection of the same together.

When the pipes have been thus connected, the centering device is collapsed and withdrawn through the opposite end of the sections by pulling on the cable 8, and is hoisted to the deck of the float, and finally the straps fastening the "strong back" to the length of pipe just connected in place, are released, and the "strong back" is hoisted to the deck of the float for use in lowering another length of pipe for attachment to the one just installed.

While in carrying the improved method into effect, I have described as the preferred procedure, the attachment of a number of pipe sections together before lowering the same for connection with the previously submerged sections, it will be understood that the pipe sections could be lowered singly and centered, and connected one after the other, without departing from the limits of the invention, the important idea being that whether a single pipe section is being dealt with, or a series of connecting sections making up a length of pipe, a centering device being employed which after performing its centering function may be removed from the connected pipe or pipes and raised to the surface of the water for another and similar operation.

Referring to Figs. 6 to 12, showing the detailed form of the centering device 7, it will be seen that the device comprises four longitudinally extending binding members or arms 15 arranged in two pairs equidistantly spaced, said arms being pivoted together at their forward inwardly curved ends as at 16, to a bracket member 17, in such manner that the arms may move outwardly and inwardly radially, whereby they may be moved outwardly from each other or expanded to bind against the inner side of the pipe section as shown in Fig. 6, and thereby be held fixed in the pipe, or they may be moved inwardly or collapsed to disengage the pipe section and permit removal of the device, as shown in Fig. 8.

Such movement of the arms is controlled by means of a central longitudinally extending extensible member 18 consisting of a plate 19 connected at its forward end to the bracket member 17 and provided with a longitudinal slot 20, and a companion plate 21 sliding against the underside of the plate 19 and provided with a longitudinal slot 22, the plate 19 carrying a bolt 23 extending in the slot 22 of plate 21, and the plate 21 carrying a bolt 24 extending in the slot 20 of plate 19, whereby said plates are tied together and permitted to slide telescopically on each other from the contracted position shown in Figs 6, 7 and 11, to the extended position shown in Fig. 8. At its rear end the plate 19 has pivoted to it a locking device or detent 19$^a$ which extends downwardly through a short slot 21$^a$ in the plate 21, and has formed on its end a nose 25$^a$ underlying the under surface of the plate 21, the purpose of which detent will presently appear.

At its rear end the plate 21 has fixed to it on its upper side, a plate 26, and to the plate 26 is fixed a right angularly extending plate 27, these plates constituting in effect a member for the attachment of two pairs of links 29 and 30 for controlling the movements of the longitudinal arms 15. The inner ends of links 29 are pivoted on parallel axes as at 31 to the opposite ends of the plate 27, and are pivoted at their outer ends as at 32, to one set of the opposing arms 15, before alluded to, while the inner ends of the links 30 are pivoted on parallel axes as at 33, to the opposite ends of plate 26, which axes extend at right angles to the axes 31, and said links have their outer ends pivoted as at 34 to the other set of opposing arms 15.

These parts are of such form and relative arrangement that when the extensible member is contracted, as shown in Figs. 6 and 11, the two pairs of links will extend at right angles to the member, and will hold the arms 15 in their outward expanded position in firm engagement with the interior of the pipe section; and when the extensible member is extended as shown in Fig. 8, such links will extend rearwardly at an inclination to the member and the arms 15 will be drawn inwardly toward each other free of the inner side of the pipe section as shown in Fig. 8. It will be understood therefore, that by moving the two plates 19 and 20 on each other as described, the arms 15 may be drawn inwardly to collapse the centering device and thus disengage the pipe section, or they may be moved outwardly to expand the centering device to engage the pipe section, and be held firmly and fixedly therein.

Such movements of the parts of the extensible member are effected and controlled by means of a slide 35 in the form of a lower plate 36 and a shorter upper plate 37, which plates are connected fixedly together at their rear ends in spaced relations, so that as shown in Fig. 1, the plate 26 will extend between said upper and lower plates 36 and 37, and the lower plate in the position of the parts shown in Figs. 1 and 11, will extend beneath and against the underside of the rear end of the plate 21 adjacent the slot 21$^a$ therein, and between said plate and the upper surface of the nose 25$^a$ of the detent 19$^a$, whereby the centering device will be releasably locked in expanded condition.

The two plates 36 and 37 are formed with alined slots 38 in which plate 27 extends, and the forward end of plate 36 is provided with a longitudinal slot 39 in which a bolt 40 depending from the plate 21 extends, whereby the slide is permitted a limited movement relative to the telescopic member longitudinally thereof, which movement is controlled and effected by the cable 8, before alluded to, attached to the rear end of the slide, as clearly shown in the drawings.

With the parts of the device in the positions shown in Figs. 6 and 11, with the extensible member contracted, the slide in its forward position and the arms 15 expanded to engage the interior of the pipe, the forward end of plate 36 of the slide will be received tightly between the underside of plate 21 and the upper surface of the nose 25$^a$ of the detent 25, and the parts will be held in this position by the friction resulting from the close fit of these parts. When now the cable 8 is subjected to a strong pull, the slide carrying the plate 36 will be drawn rearwardly far enough to trip the locking device and disengage the end of the plate from the detent, and the parts of the extensible member being thus released, the continued pull on the cable will draw the plate 21 rearwardly and extend the extensible member, thereby moving the two pairs of links to the position shown in Fig. 8, and drawing the arms 15 of the centering device inwardly out of engagement with the pipe section, and the further pull on the cable will withdraw the centering device entirely from the end of the series of pipe sections as shown in Fig. 3, whereupon the centering device may be drawn upwardly onto the float for another operation. The continued rearward movement of the plate 21 after the disengagement of the plate 36 of the slide, from the detent, will cause the forward end of slot 21ª in plate 21 to engage the forward side of the detent, and as the plate 21 is moved still further, the detent will be swung upwardly through the slot 21ª to the position as shown in Fig. 8. In resetting the parts of the centering device in seating the same in the next pipe section on the float, the slide and the parts of the extensible member are pushed inwardly to contracted condition, while at the same time, and before the slide has reached the limit of its inward movement, the detent 25 is swung down through the slot 21ª in the plate 21; and the form and relation of the parts are such that it will be necessary to drive the end of plate 36 to seat it frictionally between the detent and plate 21, so that the parts will be held frictionally and tightly in this position with the arms 15 seated in firm engagement against the interior of the pipe section. In the release therefore of the parts to permit the collapse of the centering device, a pull on the cable 8 of sufficient strength must be exercised to overcome the frictional engagement of the slide with the detent, so as thereby to release the parts of the extensible member and permit the extension of the same.

It will be understood that in applying the centering device to the pipe section or length to be connected, the centering device is seated a sufficient distance within the pipe to enable the binding arms to take a good hold thereon, whereby the inwardly curved connected forward ends of the arms, when said arms are in extended condition, will form in effect a rounded centering nose which will project a substantial distance beyond the end of the pipe, as best shown in Fig. 1, and in this form the nose may be readily guided into the end of the pipe to which the new pipe is to be connected, and will function to accurately and effectively center the two.

It will be manifest that the invention is not limited to use in the construction of sewer pipe lines, as it is applicable as well in connection with the building of pipe lines for other purposes; and also, it will be understood that the invention, while designed particularly for the construction of pipe lines under water, is not necessarily limited to such uses, but may be employed to advantage in other localities and under different conditions.

Having thus described my invention, what I claim is:—

1. A device for centering pipes, comprising in combination a series of longitudinally extending binding arms pivotally connected together at their forward ends to move outwardly and inwardly respectively, a longitudinally extensible operating member for said arms, links pivotally connected to said operating member and said arms, and a slide cooperating with the operating member to hold the same contracted with the arms in their outer position, and movable to release the operating member and permit the extension of the same to move the arms inwardly.

2. A device for centering pipes, comprising in combination a series of binding arms pivotally connected together to move outwardly and inwardly, a longitudinally extensible operating member for said arms, links pivotally connected to said operating member and to said arms, and a device cooperating with the operating member to frictionally hold the same contracted, with the arms in their outer position, and movable to release the operating member to permit the extension of the same in moving the arms inwardly.

3. A device for centering pipes, comprising in combination a series of binding arms pivotally connected to move outwardly and inwardly, a longitudinal extensible operating member for said arms, links pivotally connected to said operating member and said arms, and arranged to hold the arms outwardly when the operating member is contracted, and to move the arms inwardly when the operating member is extended, and a slide movable to a limited extent relative to the operating member and cooperating therewith in holding the operating member releasably in contracted condition, said slide being adapted when moved to release the operating member to extend the same and move the arms inwardly.

4. A device for centering pipes, comprising in combination a series of longitudinally extending binding arms, a bracket member to which said arms are pivotally connected at their forward ends to move outwardly and inwardly, an extensible operating member for said arms, consisting of an upper plate connected with the bracket plate, and a lower plate confined and sliding longitudinally on the upper plate, links pivoted at their inner ends to the lower plate and at their outer ends to the arms, a detent pivoted to the rear end of the upper plate and extending through a slot in the lower plate and provided with a nose underlying the lower plate, and a slide movable on the lower plate and adapted when moved inwardly, with the operating member in contracted condition, to engage tightly between the nose of the detent and the lower plate, thus frictionally holding the binding arms outwardly, said slide being adapted when moved outwardly to first disengage the detent and release the operating member, and then extend the operating member and move the binding arms inwardly.

5. The method of constructing pipe lines under water, which consists in fixing removably in one end of a pipe section on a suitable support at the surface of the water, a collapsible centering device having attached thereto a withdrawing cable, so that the end of said centering device will project from the pipe section and the cable will extend through the other end of the pipe section, lowering said pipe section and centering device through the water while paying out the withdrawing cable, and positioning the pipe section relative to a previously submerged pipe section, to cause the projecting end of the centering device to enter the end of the previously submerged section and thereby center the pipe sections, while causing their ends to abut, connecting said abutting ends of the pipe sections together, and pulling on the cable to first collapse the centering device, then withdraw it through the free end of the connected pipe section, and finally hoist it to the support at the surface of the water.

In testimony whereof, this specification has been duly signed by:

GEORGE BURROWS